J. CERNOHOUZ.
PHOTOGRAPHIC FILM CAMERA.
APPLICATION FILED DEC. 18, 1917.
1,293,033.
Patented Feb. 4, 1919.
2 SHEETS—SHEET 1.
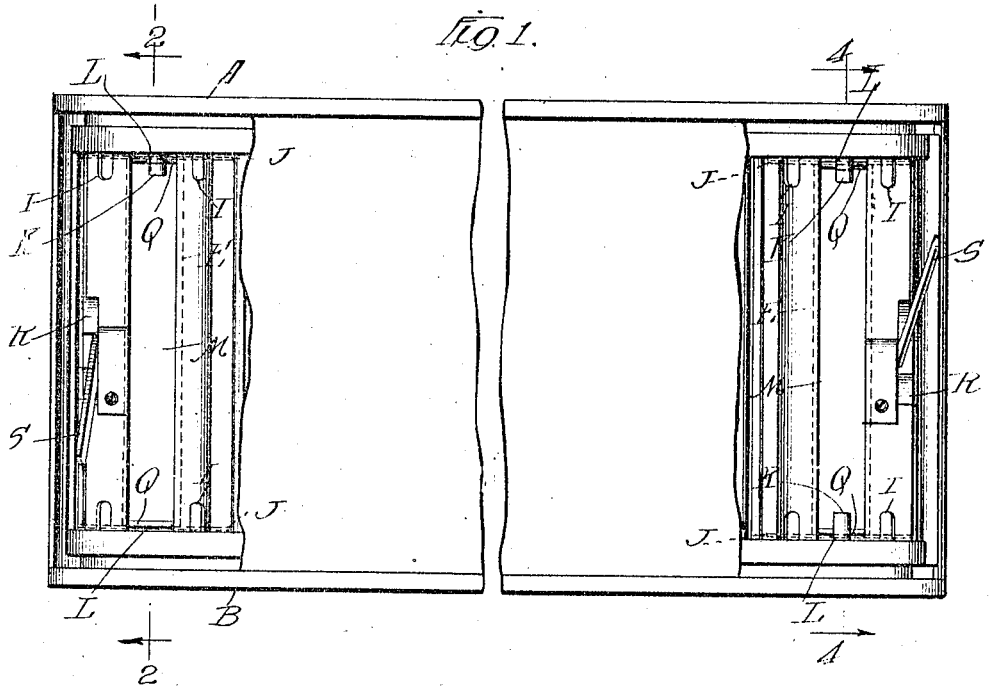
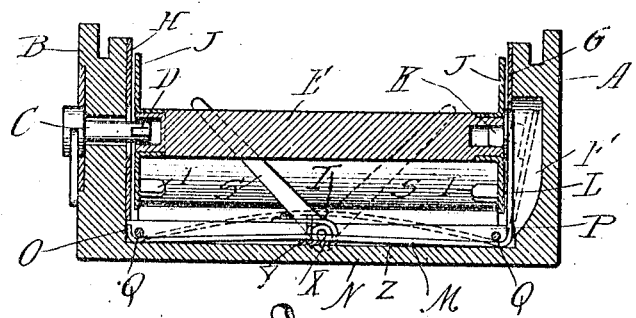
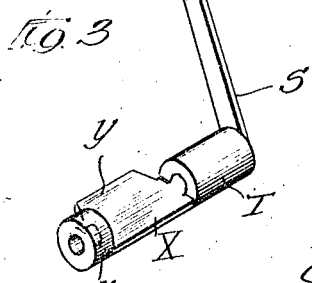
Witnesses:
Harry P. L. White
W. P. Kilroy
Inventor:
James Cernohouz
By Rudolph Jr. Atty

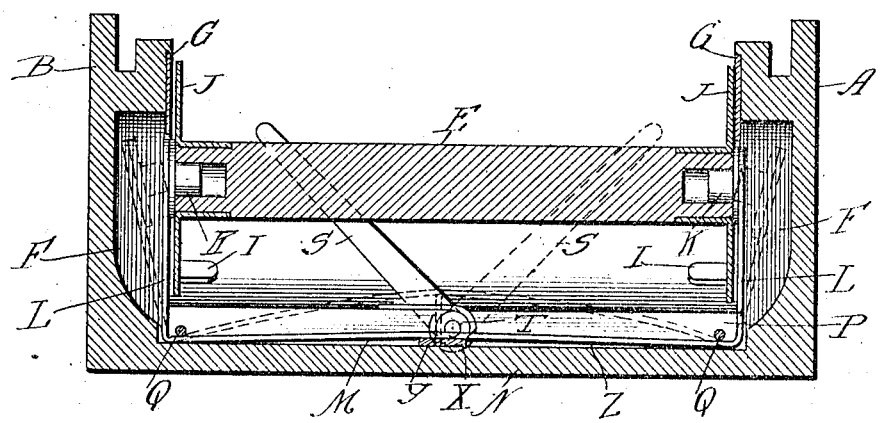
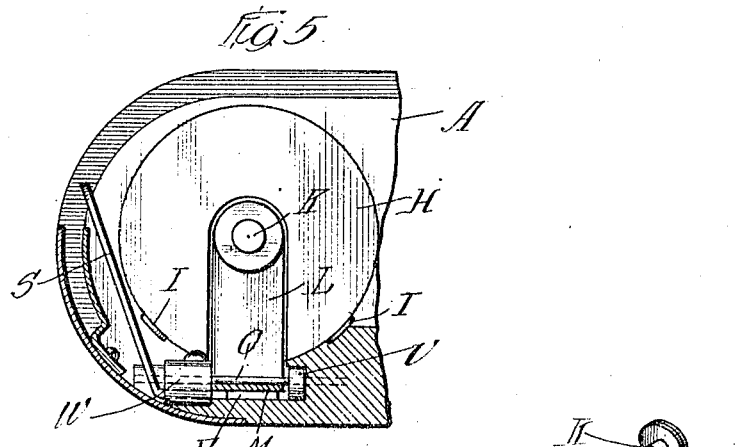
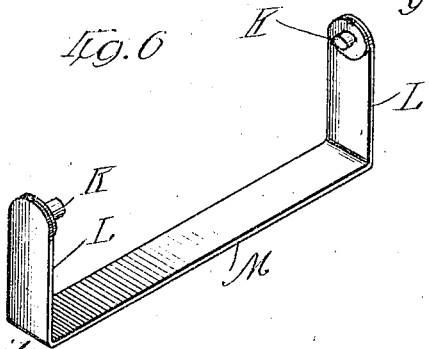
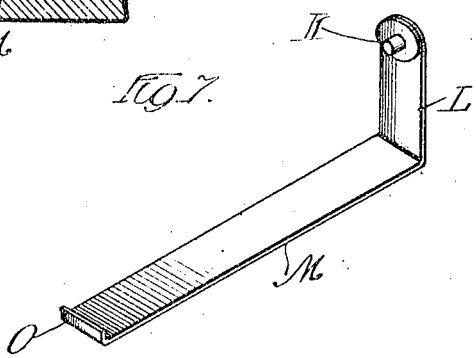

UNITED STATES PATENT OFFICE.

JAMES CERNOHOUZ, OF CHICAGO, ILLINOIS, ASSIGNOR TO BURKE & JAMES, INC., O CHICAGO, ILLINOIS, A CORPORATION OF DELAWARE.

PHOTOGRAPHIC-FILM CAMERA.

1,293,033.  Specification of Letters Patent.  Patented Feb. 4, 1919

Application filed December 18, 1917. Serial No. 207,708.

*To all whom it may concern:*

Be it known that I, JAMES CERNOHOUZ, citizen of the United States, residing at Chicago, in the county of Cook and State of Illinois, have invented certain new and useful Improvements in Photographic-Film Cameras; and I do hereby declare the following to be a full, clear, and exact description of the invention, such as will enable others skilled in the art to which it appertains to make and use the same.

This invention relates to improvements in photographic cameras, and more particularly in so-called folding pocket cameras adapted to employ flexible film mounted on spools.

The particular object of the invention is to provide means in a camera of the character defined for simultaneously releasing both ends of the feed spool for the purpose of removing the same and maintaining the pivots therefor separated until a new spool has been inserted, and to similarly provide means for readily and quickly releasing or engaging one end of the take-up spool opposite that engaged by the winding key for taking up film at intervals from the feed spool.

The invention has for its further object to provide means of the character set forth which are contained entirely within the camera housing so as to be inaccessible from the exterior thereof, thus preventing accidental operation of the same and a consequent release of a contained spool or spools.

The invention may be variously embodied and in the accompanying drawings I have illustrated only the preferred embodiment thereof.

In said drawings:

Figure —1— is a view in elevation of the rear of a folding pocket camera having its rear wall partially broken away to expose to view the film spool-engaging and releasing means constructed in accordance with the invention.

Fig. —2— is a sectional view on the line 2—2 of Fig. —1—.

Fig. —3— is a detail perspective view showing one of the operating parts of the film spool engaging and releasing means.

Fig. —4— is a section similar to Fig. —2— on the line 4—4 of Fig. —1— showing the mechanism for engaging and releasing the feed spool.

Fig. —5— is a detail transverse section on the line —5— of Fig. —4—.

Figs. —6— and —7— are respectively detail perspective views of pivot-carrying springs employed.

In said drawings A and B indicate the side walls of a camera housing which has rounded end portions. The said walls A and B are relatively thick and through one end of one thereof a winding key C projects, the same being equipped with a crosshead B adapted to engage in the transverse slot in one end of the hub E of a film spool of the standard kind employed in kodaks or cameras of this character. The said winding key C is normally held at the inner limit of its movement in engaging relation to a film spool by means of a spring, the latter being omitted from illustration and constituting no part of the present invention. Said key is released from engagement with the film spool by manually forcing said key outwardly against the action of its engaging spring, and is so held during the operation of removing and replacing spools.

In the wall A opposite the point in the wall B wherein the winding key C is mounted there is a recess F which is covered by a metal plate G having a central opening therein. Said plate and a similar plate H mounted upon the inner face of the wall B and having a central opening through which the winding key C projects are provided with projections I to engage the peripheral edges of the flanges J of the film spool for readily positioning the same so that the openings in the ends of said spool will become disposed respectively opposite the winding key C and the pivot member K normally projecting through its central opening in the plate G. The said pivot member K is mounted upon the free end of an arm L of a flat spring M which lies normally in contact with the front wall N of the housing, and is provided at its other end with a short flange or projection O. The said spring is contained in a recess P in the front wall N and said recess is spanned contiguous to its ends by rods Q underneath which the said spring M projects. The rod Q contiguous to the recess F constitutes a fulcrum on which the arm L carrying the pivot member K turns as a fulcrum when said spring is bowed, as shown in dotted lines in Fig. —2—. Disposed parallel with the recess P is another recess R in which the inner end of a lever S is contained. The latter is rigid with a shaft T which lies in a recess or pocket communicating at opposite ends with the recesses P and R, and which is provided with a portion B lying in an opening in a rather thick and heavy portion of the camera housing, shown more particularly in Fig. —5—. The first-named portion of the shaft is retained in its pocket by means of a flat spring or plate W. Between the aforesaid portions of the said shaft is a flat portion X having a flange or wing Y projecting beyond the circumferential face of the shaft, and which normally lies underneath and partially bows the flat spring M between its ends as shown in Fig. —2—. The said flat portion normally lies parallel with the front wall of the housing, and when turned through an arc of ninety degrees, as indicated in Fig. —2—, serves to bow the spring M to an extent sufficient to cause the arm L thereof to turn through sufficient arcs to entirely withdraw the pivot member K from engagement in the end of the spool E, thus releasing said end of said spool.

The spring Z in the other end of the housing adapted to contain the feed spool is provided with two of said arms L at opposite ends, each of which carries a pivot member K and which is bowed by mechanism identical with that hereinbefore described; both said arms being thus simultaneously turned as shown in dotted lines in Fig. —4— to release both ends of the contained spool, as will be obvious.

It will be understood, of course, that the aforesaid mechanism is capable of some modifications and variations without departing from the invention as defined in the appended claims.

I claim as my invention:

1. In a film-spool camera including a housing having a posterior opening and a removable cover for same, a pair of opposed pivot members disposed within the casing and adapted to engage opposite ends of a film-spool, and a manually operable member disposed within the camera housing and operable only upon opening the cover for the said posterior opening operatively associated with said pivot-members for simultaneously moving the same in opposite directions.

2. In a film-spool camera, a pair of opposed pivot carrying members disposed within the casing and adapted to engage opposite ends of a film-spool, a flexible connecting element for said members, fulcrum elements associated with said members and said flexible element, and a manually operable member operatively associated with said flexible element and coöperating with said fulcrum elements for flexing the same and thereby simultaneously moving the said members in opposite directions.

3. In a film-spool camera, a pair of opposed pivot carrying members disposed within the casing, a flexible element integral therewith for normally holding the same in engaging relation to opposite ends of a film spool, fulcrum elements on which said members are adapted to turn, and a manually operable member operatively associated with said flexible element and said fulcrum elements for flexing the former for simultaneously throwing the pivot-carrying members out of engaging relation to said film-spool.

4. In a film spool camera, a film spool pocket, a flexible element mounted in the bottom thereof and provided with end flanges, a pair of fulcrum members mounted to engage said flanges adjacent to their junction with the middle portion of said flexible member, at least one of said flanges carrying a pivot pin normally positioned to engage in one end of a film spool disposed in said pocket, and a manually operable element for flexing said flexible member and coöperating with said fulcrum elements for effecting movement of said pivot pin carrying flange to throw the pivot pin out of engaging relation to the film spool.

5. In a film-spool camera, spool chambers, a substantially U-shaped spring disposed in each thereof, retaining means engaging the same at its elbows, a pivoted lever actuated member disposed in engagement with the middle portion of each spring and adapted when turned through a predetermined arc to bow said middle portion and effect simultaneous opposite movement of the arms thereof, recesses in the side walls of the housing containing said arms, and spool-engaging pivot members mounted at the free ends of said arms.

JAMES CERNOHOUZ.